(12) United States Patent
Smith et al.

(10) Patent No.: US 9,141,537 B2
(45) Date of Patent: Sep. 22, 2015

(54) MAGNETIC RANDOM ACCESS MEMORY JOURNAL

(71) Applicant: Mangstor, Inc., Austin, TX (US)

(72) Inventors: Trevor Smith, Austin, TX (US); Ashwin Kamath, Cedar Park, TX (US)

(73) Assignee: MANGSTOR, INC., Austin, TX (US)

( * ) Notice: Subject to any disclaimer, the term of this patent is extended or adjusted under 35 U.S.C. 154(b) by 77 days.

(21) Appl. No.: 14/065,641

(22) Filed: Oct. 29, 2013

(65) Prior Publication Data

US 2014/0122780 A1    May 1, 2014

Related U.S. Application Data

(60) Provisional application No. 61/719,986, filed on Oct. 30, 2012, provisional application No. 61/719,994, filed on Oct. 30, 2012, provisional application No. 61/720,000, filed on Oct. 30, 2012.

(51) Int. Cl.
*G06F 12/00* (2006.01)
*G06F 12/02* (2006.01)
*G06F 11/14* (2006.01)
*G06F 12/08* (2006.01)

(52) U.S. Cl.
CPC ........ *G06F 12/0246* (2013.01); *G06F 11/1441* (2013.01); *G06F 12/0866* (2013.01); *G06F 12/0804* (2013.01)

(58) Field of Classification Search
CPC ......................... G06F 12/0804; G06F 12/0866
See application file for complete search history.

(56) References Cited

U.S. PATENT DOCUMENTS

2013/0179751 A1*  7/2013  Linstadt ......................... 714/763
2014/0258588 A1*  9/2014  Tomlin et al. .................. 711/103

* cited by examiner

*Primary Examiner* — Zachary K Huson
(74) *Attorney, Agent, or Firm* — Andrews Kurth LLP; Sean S. Wooden

(57) ABSTRACT

A flash memory system comprises a logic block interface operable to receive a write command to store data from a host computer, a flash memory device operable to store the data in response to the write command, and a non-volatile memory communicatively coupled to the flash memory device and the logic block interface operable to temporarily store the data, and to provide the stored data to be written to the flash memory device in the event of a disruption during execution of the write command.

20 Claims, 2 Drawing Sheets

MAGNETIC RANDOM ACCESS MEMORY JOURNAL

RELATED APPLICATION

The present application claims the benefit of U.S. Provisional Patent Applications Nos. 61/719,986; 61/719,994; and 61/720,000, all filed on Oct. 30, 2012, which are incorporated herein by reference.

FIELD

The present disclosure relates to data storage devices, and in particular to using a Magnetic Random Access Memory (MRAM) journal for data backup for a flash memory device.

BACKGROUND

Flash memory devices have been recognized as an attractive non-volatile data storage option for mobile computers and smartphone devices because of their small size, lightweight, shock resistance, fast access speed, and low power consumption. It is anticipated that with further advances in flash memory technology, its popularity may rival or even outpace hard disks. However, due to the different construction of flash memory as compared with a hard disk device, there are special considerations that have to be addressed in order to take advantage of the flash memory device.

In a flash memory device, a write operation has to be preceded by an erase operation, which takes much longer than the write operation itself. Further, the smallest addressable unit for read and write operations is a page, but the smallest erasable unit is a block. This means that to even write a single byte of data into a flash memory requires the erase and restoration of a block of data. In the unexpected event of power loss after the data is erased but before the data is restored and written into the flash memory, data would be lost if no precaution has been taken to address this issue.

In some conventional flash memory devices, capacitive devices have been used to keep supplying power to the flash memory so that the write operation may be completed. Such implementations not only have large component costs, but may be inadequate as the completion time for the write operation is unpredictable. The power in the capacitive device may still be insufficient to complete the write.

SUMMARY

A flash memory system comprises a logic block interface operable to receive a write command to store data from a host computer, a flash memory device operable to store the data in response to the write command, and a non-volatile memory communicatively coupled to the flash memory device and the logic block interface operable to temporarily store the data, and to provide the stored data to be written to the flash memory device in the event of a disruption during execution of the write command.

A method comprises receiving a write command to store data in a flash memory device from a host computer, storing the data in a non-volatile memory, in the event of a disrupted write operation to the flash memory device: reading the data from the non-volatile memory, verifying the validity of the data, and writing the valid data read from the non-volatile memory to the flash memory device.

A computer readable medium having encoded thereon a method comprising receiving a write command to store data in a flash memory device from a host computer, storing the data in a MRAM journal, in the event of a disrupted write operation to the flash memory device: reading the data from the MRAM journal, verifying the validity of the data, and writing the valid data read from the MRAM journal to the flash memory device.

DETAILED DESCRIPTION

A flash memory has a very different construction than a hard disk device, which is generally organized in sectors. A flash memory device is organized into multiple planes, which are in turn organized into multiple blocks. The blocks are divided into multiple pages. In a flash memory device, a write operation is preceded by an erase operation, which takes much longer than the write operation itself. Further, the smallest addressable unit for read and write operations is a page, but the smallest erasable unit is a block. This means that to even write a single byte of data into a flash memory requires the erase and restoration of a block of data. In the unexpected event of power loss after the data is erased but before the data is restored and written into the flash memory, data would be lost if no precaution has been taken to address this issue.

Figure 1:
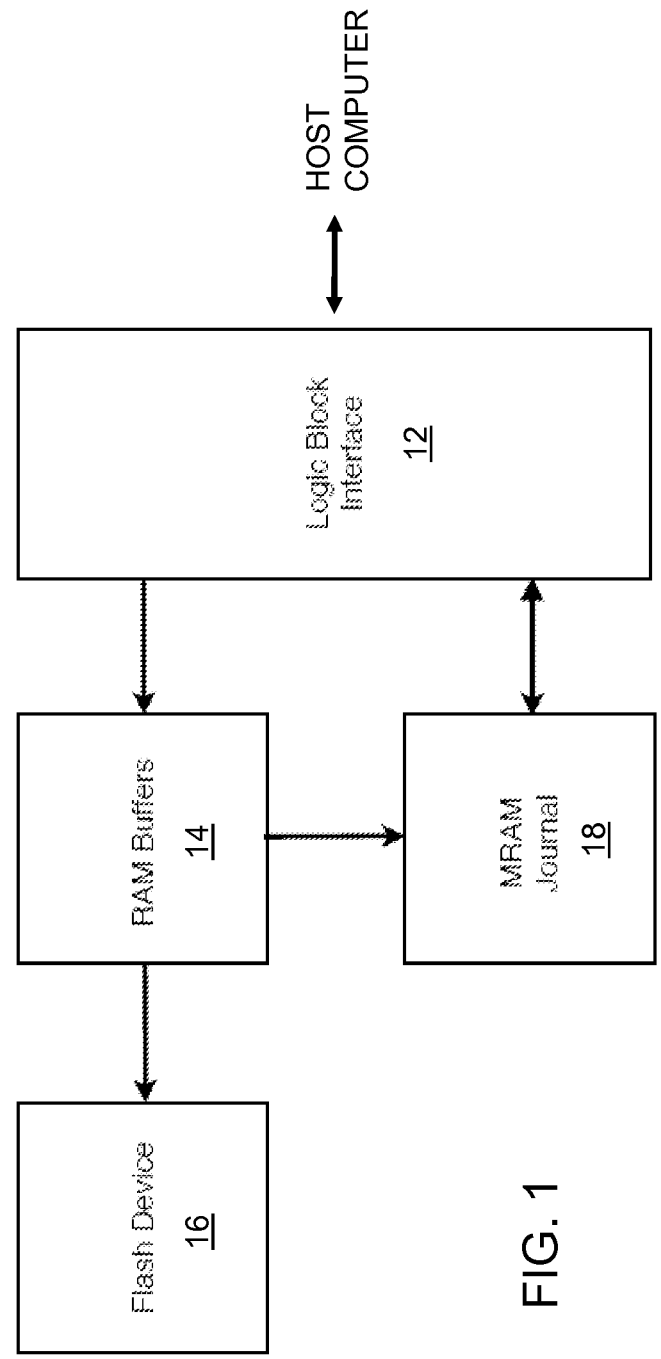
FIG. 1 is a simplified block diagram of an exemplary embodiment of a flash memory device according to the present disclosure.

FIG. 1 is a simplified block diagram of an exemplary embodiment of a flash memory device 10 according to the present disclosure. The flash memory device 10 includes a logic block interface 12 that serves as an interface to a host computer or host device (not shown). The logic block interface 12 may include Flash Translation Layer (FTL) functionality to provide a translation between the logical block addresses used in the read and write commands issued by the host computer, and the physical block or page addresses in a flash memory device 16. FTL typically stores address mapping data in one or more mapping tables. RAM (Random Access Memory) buffers 14 are communicatively coupled between the logic block interface 12 and the flash memory device 16. The RAM buffers 14 are used to buffer or temporarily hold data to be written to the flash device 16 as well as the translated physical address of the location for the write operation. A MRAM (Magnetic Random Access Memory) journal 18 is further communicatively coupled with the logical block interface 12 and the RAM buffers 14. The MRAM technology is a non-volatile memory device that does not rely on a power source to retain the stored data, and can maintain the data nearly permanently. MRAM technology also has better write/read performance characteristics than most other non-volatile memory technologies.

In a write operation, data to be written into the flash device 16 are written into the RAM buffers 14 as well as the MRAM journal 18. Additionally, the address location to which the data are to be written in the flash device 16 is also retained in the MRAM journal 18. After data is written to the MRAM journal 18, a write completion signal is generated and sent up the storage stack. The write from the RAM buffers 14 to the flash memory device itself may take any amount of time or not occur at all in the event of an unforeseen event, such as unplanned power loss. If the write operation is disrupted due to, for example, power loss or a write error, the data retained in the MRAM journal 18 are used to restore data to the flash memory device 16 and complete the write operation upon power up.

Figure 2:
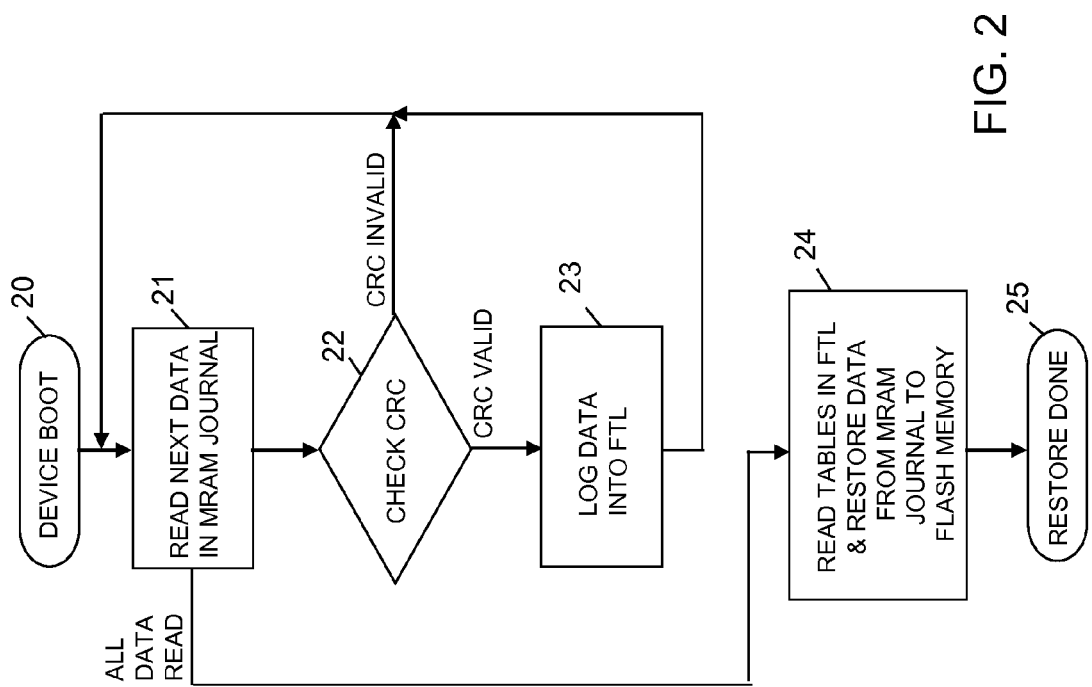
FIG. 2 is a simplified flowchart of an exemplary embodiment of a flash memory boot procedure according to the present disclosure.

FIG. 2 is a simplified flowchart of an exemplary embodiment of a flash memory boot procedure 20 according to the present disclosure. The boot procedure 20 is performed upon power up after unexpected power loss, for example. In block 21, the "next" data (as specified by a "next" pointer, for example) in the MRAM journal 18 are read. In block 22, the cyclic redundancy check (CRC) is verified to determine whether the data read from the MRAM journal are valid. It is contemplated that other methods of verifying the validity of the data may be used. If the CRC indicates that the data are not valid, then the process returns to block 21 to read the next data in the MRAM journal 18. If the CRC indicates that the data read from the MRAM journal 18 are valid, then in block 23 the data are logged or stored into the Flash Translation Layer (FTL) of the logic block interface 12 that is operable to perform functions such as address translation, for example. The process then returns to block 21 to read the next data in the MRAM journal 18. Once all the data associated with the current write operation are read from the MRAM journal 18, the FTL mapping tables are accessed to perform address translation and used to write the data to the proper addresses in the flash memory device 16 in block 24. In block 25, the restore part of the boot process ends.

In this manner, as long as the data have not been properly written to the flash memory device, i.e., due to a write error or power-loss, the data are retained in the MRAM journal and can be accessed upon power-up. Additionally, subsequent read operations to the same blocks of data can be read directly from the MRAM journal for as long as the data have not been placed into the flash memory device. One advantage of such an approach is that very high data rates may be achievable since the MRAMs are used only for data write during bulk I/O operations.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

What is claimed is:

1. A flash memory system comprising:
  a logic block interface operable to receive a write command to store data at a specified address location from a host computer;
  a flash memory device communicatively coupled to the logic block interface operable to store the data at the specified address location in response to the write command; and
  a non-volatile memory communicatively coupled to the flash memory device and the logic block interface operable to temporarily store the data and the specified address location, and to provide the data and the specified address location to the logic block interface to be written to the flash memory device after recovering from a disruption that occurs during execution of the write command.

2. The flash memory system of claim 1, wherein the non-volatile memory comprises MRAM technology.

3. The flash memory system of claim 1, wherein the non-volatile memory is operable to provide the data and the specified address location to the logic block interface to be written to the flash memory device after recovering from a power loss during the execution of the write command.

4. The flash memory system of claim 1, wherein the non-volatile memory is operable to provide the data and the specified address location to the logic block interface to be written to the flash memory device after recovering from a write error during the execution of the write command.

5. The flash memory system of claim 1, wherein the non-volatile memory comprises a journal.

6. The flash memory system of claim 1, further comprising a buffer coupled to the logic block interface adapted to receive and buffer the data to be written to the flash memory device from the host computer.

7. The flash memory system of claim 1, wherein the logic block interface further comprises a Flash Translation Layer module adapted to providing translation between logical addresses provided by the host computer and physical addresses in the flash memory device.

8. A method comprising:
  receiving, from a host computer, a write command to store data at a specified address in a flash memory device;
  storing the data and the specified address in a non-volatile memory;
  performing a write operation to the flash memory device in response to the write command;
  in the absence of a write completion signal indicating of a disruption to the write operation to the flash memory device:
    reading the data and the specified address from the non-volatile memory;
    verifying the validity of the data; and
    writing the verified data from the non-volatile memory to the specified address in the flash memory device.

9. The method of claim 8, wherein reading the data from the non-volatile memory comprises reading the data and the specified address from the non-volatile memory in the event of a power loss during the write operation.

10. The method of claim 8, wherein reading the data from the non-volatile memory comprises reading the data and the specified address from the non-volatile memory in the event of a write error during the write operation.

11. The method of claim 8, wherein storing the data in a non-volatile memory comprises storing the data in an MRAM device.

12. The method of claim 8, wherein verifying the data from the non-volatile memory comprises verifying the CRC of the data.

13. The method of claim 8, further comprising buffering the data in a RAM buffer in response to receiving the write command.

14. The method of claim 8, further comprising translating a logical address specified in the write command to a physical address and storing the addresses in a logical block interface.

15. The method of claim 14, further comprising fetching the physical address from the logical block interface prior to writing the verified data to the flash memory device.

16. A non-transitory computer readable medium having encoded thereon a method comprising:
  receiving, from a host computer, a write command to store data at a specified address in a flash memory device;
  storing the data and the specified address in a non-volatile memory;
  performing a write operation to the flash memory device in response to the write command;
  in the event of an interrupted write operation to the flash memory device:

reading the stored data and the specified address from the non-volatile memory;
verifying the validity of the data; and
writing the verified data from the non-volatile memory to the specified address in the flash memory device.

17. The non-transitory computer readable medium having encoded thereon a method of claim 16, wherein verifying the data from the non-volatile memory comprises verifying the CRC of the data.

18. The non-transitory computer readable medium having encoded thereon a method of claim 16, further comprising buffering the data in a RAM buffer in response to receiving the write command.

19. The non-transitory computer readable medium having encoded thereon a method of claim 16, further comprising translating a logical address specified in the write command to a physical address and storing the addresses in a logical block interface.

20. The non-transitory computer readable medium having encoded thereon a method of claim 19, further comprising fetching the physical address from the logical block interface prior to writing the valid data to the flash memory device.

\* \* \* \* \*